(12) United States Patent
Egeresi

(10) Patent No.: US 7,014,147 B2
(45) Date of Patent: Mar. 21, 2006

(54) ANTI HIJACKING SYSTEM

(75) Inventor: Zoltan Egeresi, 5500 Coast Rd, Santa Cruz, CA (US) 95060

(73) Assignee: Zoltan Egeresi, Santa Cruz, CA (US)

( * ) Notice: Subject to any disclaimer, the term of this patent is extended or adjusted under 35 U.S.C. 154(b) by 107 days.

(21) Appl. No.: 10/397,563

(22) Filed: Mar. 27, 2003

(65) Prior Publication Data

US 2004/0188565 A1 Sep. 30, 2004

(51) Int. Cl.
*B64D 11/00* (2006.01)

(52) U.S. Cl. .................................. 244/118.5

(58) Field of Classification Search ............ 109/3; 244/118.5, 137.2, 129.1
See application file for complete search history.

(56) References Cited

U.S. PATENT DOCUMENTS 1,428,003 A * 9/1922 Chambers ................. 109/3
3,811,643 A * 5/1974 Pizzo ..................... 244/118.5
6,219,959 B1 * 4/2001 Hsich ........................ 109/3

OTHER PUBLICATIONS

The net-book of tricks and traps, the greed trap 1, date unknown but old.*

* cited by examiner

*Primary Examiner*—Galen Barefoot

(57) ABSTRACT

This low cost non lethal Anti Hijacking System is essentially a crowd control system in the sky in a confined area of an airplane, a last line of defense against a single or team of would be hijackers. An anti hijacking crowd control/capturing system comprising of a flexible stainless steel net located behind the cockpit under the carpet, connected to four winches and manually activated by the crew to lift up would be hijackers to the ceiling, or simultaneous side by side activation of two winches create a barrier for horizontal passage or keep them secured to a wall, "buckled up". This system can be installed on any aircraft.

3 Claims, 3 Drawing Sheets

ANTI HIJACKING SYSTEM

BACKGROUND OF THE INVENTION

1. Field of the Invention

Hijacking has been a problem for many years, and it is becoming an ever increasing problem after the 9/11 multi hijacking causing loss of many lives, property and economic damages. Not all available anti hijacking methods are perfect or available or fail safe. Safety systems must be multi layer, since none of them are 100% fool proof or different methods are needed in different cases.

Hand carry bag checking by X ray or by security could still miss some contraband items, or some weapons may get on board by service personnel bypassing security. Using lethal handgun on board stunt gun or mace to prevent hijacking may not be allowed by all airlines or governments.

Air marshals are expensive, and they may not be available on all flights.

Chemical spray, stunt or low velocity gun may be usable but could be lethal and there is a chance these devices may fall in the wrong hand and using it in a confined are may not be advisable.

My invention is a non-lethal self-defense system usable by the flight attendants or by the pilots, which can be very effective in case of group of people trying to overtake the plane as it happened on 9/11.

This invention also can be considered as a non-lethal crowd control system in a confined area.

2. Description of the Related Art

Reinforced cockpit doors can prevent most forced, unauthorized cockpit entry as in some prior art U.S. Pat. No. 3,704,845 or U.S. Pat. No. 5,577,358. Prior art U.S. Pat. No. 3,680,499 uses gas, but this invention became obsolete by invention of the mace. Using gas in a confined area is not the most desirable defense. Terrorists keep on thinking about new ways for overtaking commercial airline with "minimal available" weapons by using more people to over-power the crew. Chambers U.S. Pat. No. 1,428,003 in a bandit trap contraption uses pre-positioned weight traveling from ceiling to a basement, needing a guard to activate it. This system could have been a suitable device 80 years ago for a confined business area with a basement (for dropping pre-positioned weight) to activate the net. This invention also needs a guard for manual triggering. In case of air turbulence false trigger can cause an unintentional human trapping and it is heavy and cumbersome. Pizzo in his U.S. Pat. No. 3,811,643 describes an anti hijacking system in which an extensive structural changes would require trapping nets below false floor to be installed on the air plane behind the cockpit. Captured would be hijacker than is ejected from the belly of the plane (using a bomb bay) by parachute for a "safe landing". Try to parachute from a plane flying 4–500 mph over water without oxygen mask, –60 F. temperature from 30,000 feet without a lawsuit and survive it.

Hsich in U.S. Pat. No. 6,219,959 B1 explains an overhead net capturing device for capturing a robber in places like banks, business uses a net dropping from the ceiling, than the inventor hopes for an ideal condition for net closing on the bottom to disable the would be robber, most likely a single one. This invention as it is described, is an unattended system triggered by infrared beams. Barriers would fall from above immediately, not exactly an ideal solution in a confined area in the sky. This invention has no mention of the kind or type of net being used, most type of nets could be cut with knife.

It is easy to see, that most of the prior art systems (using net) has no place on today's flight deck for being too expensive, unworkable, or just for being totally unsuitable for the intended job.

My invention overcomes the shortcomings of these prior arts, it is lightweight for aircraft use, it is safe, non lethal, can be activated by the flight crew or flight attendants, capable to hold several would be hijackers in the same time, strong stainless steel net is used which can not be cut by knife.

BRIEF SUMMERY OF THE INVENTION

When one or more person is trying to over power the pilots, this anti hijacking system can provide a non-lethal last line of defense. Doors on the cockpit may not be penetration proof. When pilot or flight attendant is confronted with a situation where the pilot's door is about to be penetrated, a concealed stainless steel net from below the carpet will hoist up all people to the ceiling or simulations side by side winch activation will hold the trapped people by the wall immobilizing them.

Winches located below ceiling wind up the concealed cabling behind the paneling. Winches are to be activated by crew by activating one or more concealed emergency switches.

The object of this invention is prevent the overtaking by group or individual would be hijackers.

BRIEF DESCRIPTION OF SEVERAL VIEWS OF THE DRAWING

Sheet one

This invention is a non-lethal way to capture one or more would be highjacker.

Behind the pilot's door a special steel net (14) under the carpet, (2) is connected to at least four concealed cables (5) connecting to a winch system (4). In case of emergency, pilot or flight attendant can activate the winch system, and it lifts up all persons in the net (2).

Figure 3:
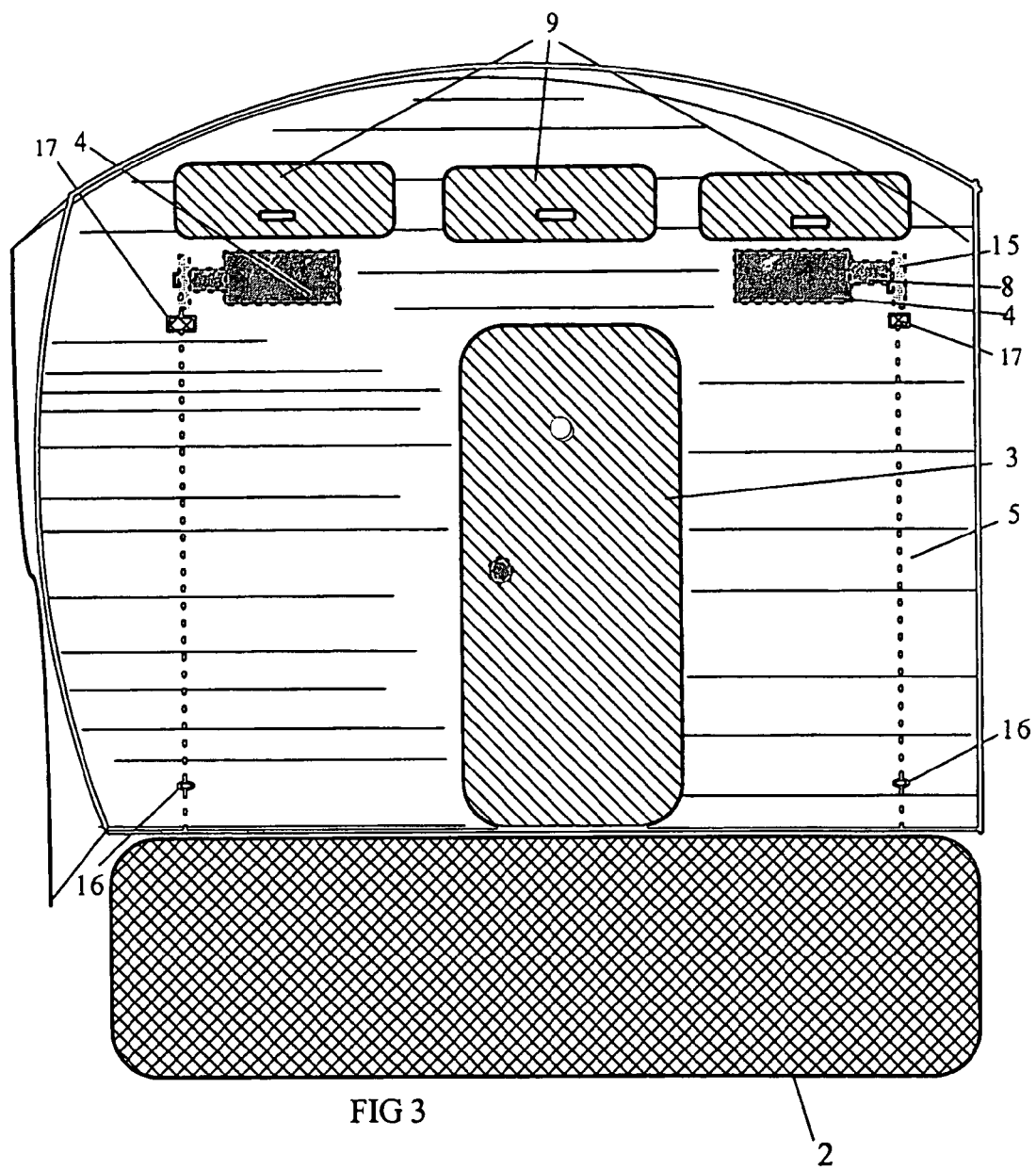
Figure 4:
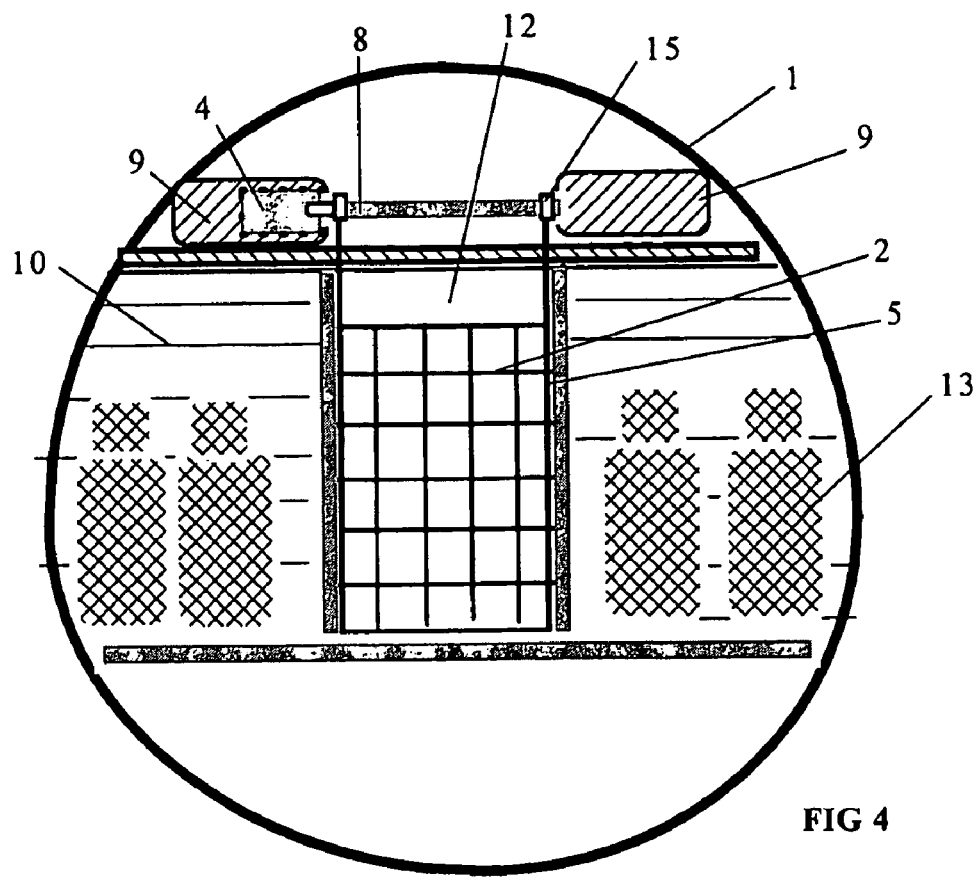
Figure 5:
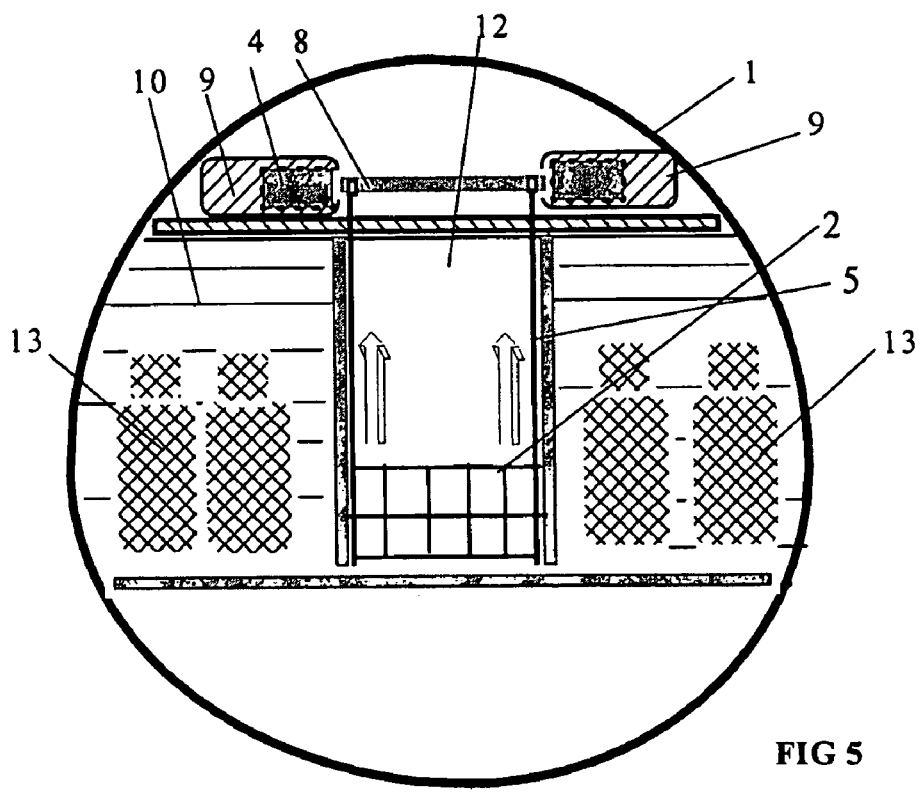

Sheet 2 FIG. 3 shows the cockpit's wall and door (3), floor net concealing the steel net, cables (5) connecting to the winches (4). Sheet 3 FIGS. 4 and 5 shows a cross section of the fuselage with chairs (13) by the cabin separating wall (10). In case of on board disturbance, steel net (2) can be winched up to separate cabins by winch (4).

DETAILED DESCRIPTION OF THE INVENTION

Figure 1:
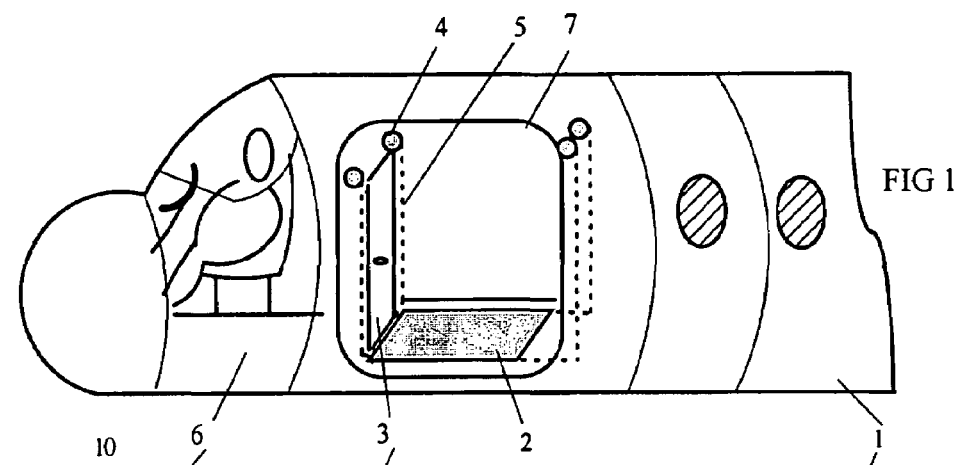
FIGS. 1 and 2 shows a perspective side view of an airplane entrance behind the cockpit.
Figure 2:
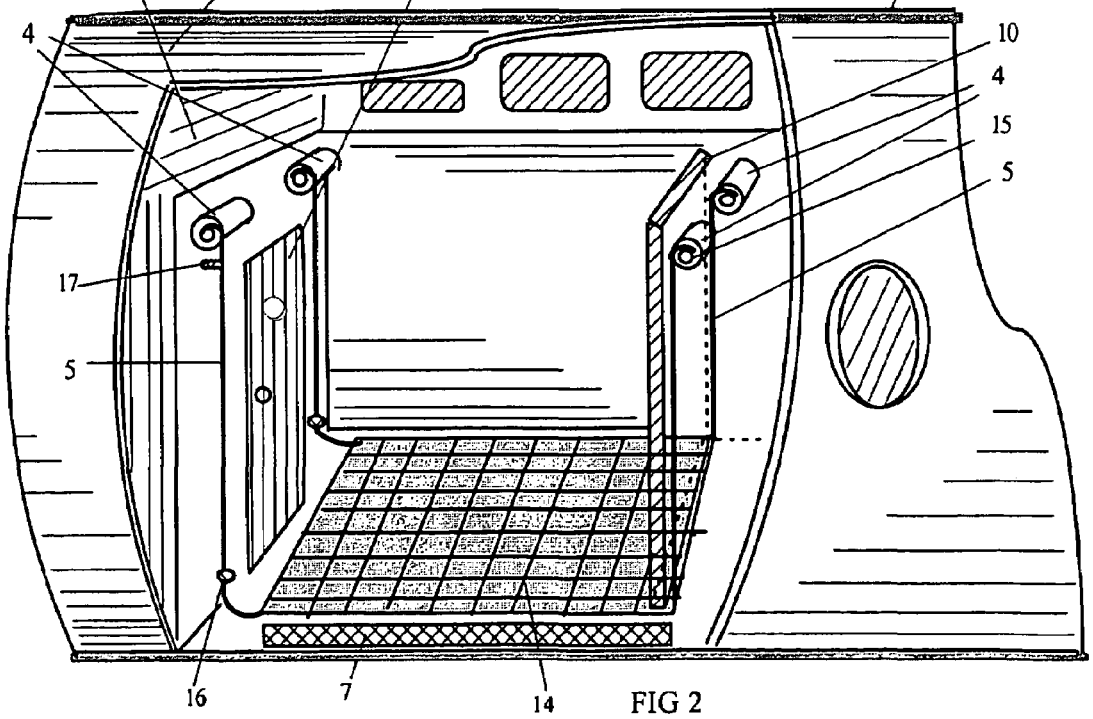

On sheet 1 of the drawings FIG. 1 and FIG. 2 show a passenger plane (1) entry/exit (7) behind the cockpit (6). Behind the pilot's door (3) under the carpet (2) there is a stainless steel wire net (14) laid down, concealed. Wire net (14) connects to four cables(S) as shown on FIGS. 1, 2, 3, which is connected to the winches (4). Preferred location of the winches (4) are in the luggage compartment (9) out of sight. Independently operated concealed three position switches (up, down, stop not shown) are located in the pilot's cabin (6) behind the door (3) and wall (10) in the cockpit and somewhere in the flight crew area. Flight attendants or pilot from behind the cockpit door can judge the situation as to use all four winches to lift up all person or just to lift one side of the net (14) to foil the hijacking attempt by holding people next to the wall as a crowd control method to hold them in a confined area. Consider them buckled-up. On FIG. 2 and FIG. 3 cables (5) are concealed in the wall paneling behind trimmings, which rolls up on the pulley (8) when activated, immobilizing anybody. FIGS. 2 and 3 shows cable (5) with a small clamp (16) approximately one foot from the net, when this clamp reaches extreme position sensor (17) it disconnects the up switch (switches are not shown). Sheet 3 of the drawing show the cross section of a plane where the cabins are separated. On FIG. 4 and FIG. 5 the steel net (2) is located in the floor where the cabinets are divided by wall (10). This cross section shows the passenger seats (13) front or behind the dividing wall. Winch (4) with pulley (8) lifts the steel net (2) straight up by the cables (5) where the curtain (12) is normally located to separate the cabins in case of any disturbance. Single winch with an extended shaft (8) and pulley (15) can block movement in the cabin in case of group of would be hijackers need to be kept away from the pilots cabin, until safe landing can be performed.

The invention claimed is:

1. An anti hijacking crowd control/capturing system for an aircraft comprising, plural winches concealed within the walls of a passenger area of said aircraft, a flexible high strength net located within said passenger area under a floor covering thereof, said net is connected at plural locations by cables concealed in the walls of said passenger area, said cables are connected to said winches and when said winches are activated, the cables pop out of the walls and pull the net from beneath the floor covering to capture and control designated passengers, and these cables have an extreme stop activator to stop winches at least one foot from ceiling when the cables are winched up by the winches.

2. An anti hijacking crowd control/capturing system for an aircraft as stated in claim 1 and further comprising, switches for said winches are located in plural locations in a cockpit and in said passenger area of said aircraft, said switches have three positions, up, down and stop, manually controllable by the crew or pilot as they can see when and how to activate said winches.

3. An anti hijacking crowd control/capturing system for an aircraft as claimed in claim 2 and further comprising, said switches individually control respective winches behind the cockpit and when all are activated said net will lift up all people in the net, with selective actuation of fewer winches said net will be lifted up on only one side to trap the people by a wall or keep them further away from the cockpit, or a single winch can lift up said net to separate an area in case several people try to lunge forward at the same time.

* * * * *